Patented Sept. 8, 1936

2,053,845

UNITED STATES PATENT OFFICE 2,053,845

PRODUCTION OF ALDEHYDES

Otto Schmidt, Karl Huttner, and Georg Kaeb, Ludwigshafen-on-the-Rhine, Germany, assignors to I. G. Farbenindustrie Aktiengesellschaft, Frankfort-on-the-Main, Germany No Drawing. Application February 6, 1933, Serial No. 655,472. In Germany February 11, 1932

11 Claims. (Cl. 260—138)

The present invention relates to the production of aldehydes.

Aliphatic aldehydes have been usually prepared by heating calcium salts of saturated aliphatic mono-basic acids with calcium formate. In another manner saturated aldehydes have been prepared by passing vapours of the corresponding fatty acids together with formic acid over hot manganous oxide. Similarly hexylenealdehyde has been obtained by passing hexylenic acid together with formic acid over hot manganous oxide. If this process be applied to aliphatic unsaturated carboxylic acids containing at least 10 carbon atoms, as for example oleic acid, no unsaturated aldehydes are obtained but ketones result by the splitting off of carbon dioxide and of water from two molecular proportions of the unsaturated fatty acid, so that di-heptadecenyl ketone is formed from oleic acid and formic acid.

We have now found that very good yields of unsaturated aldehydes can be obtained from mixtures of volatile unsaturated carboxylic acid substances, especially fatty acid substances containing at least 10 carbon atoms in the acid radicle, and volatile formic acid substances by passing vapours of the said mixture over decarboxylation catalysts while taking care that the partial pressure of that unsaturated carboxylic acid substance within the reaction space is at the most 1/30 of an atmosphere.

Carboxylic acids of the aforesaid nature are for example undecylenic acid, oleic acid, linoleic acid, ricinoleic acid, abietic acid, naphthenic acids containing at least 10 carbon atoms, as well as mixtures consisting, or containing preponderating quantities, of unsaturated carboxylic acids of the said nature as occur for example in the form of their esters in numerous oils and fats of vegetal, that is vegetable and animal origin, such as castor oil, linseed oil, China-wood oil or train or fish oils. Instead of the free acids volatile derivatives thereof may be employed as for example their esters, anhydrides or halides. Similarly, formic acid may be employed in the form of its esters such as methyl, ethyl, propyl or butyl formates. It is to be understood of course that the said carboxylic acid substances must be capable of volatilization without decomposition of the acid radicles. The formic acid substance used is preferably employed in quantities exceeding equimolecular proportions; in the case of producing aldehydes of the type of oleic aldehyde for example a ratio of one molecular proportion of fatty acid, such as oleic acid to from 3 to 4, or up to 8, molecular proportions of formic acid furnishes very good results. Such ratio in the proportion of the acids in the reaction space furnishes generally good yields with a low consumption of formic acid. The aforesaid low partial pressure of the unsaturated carboxylic acid substance may also be attained by working in vacuo or by the addition of further quantities of volatile formic acid substance, such as from 3, 4 or more molecular proportions, or of inert gaseous diluents, as for example carbon dioxide, methane or nitrogen. By either of these means or by a combination thereof the partial pressure of the unsaturated carboxylic acids in the reaction space is kept at the most at 1/30 of an atmosphere, usually between 1/30 and about 1/100 and, preferably, at about 1/50 of an atmosphere.

The catalysts employed are generally chosen from those which are known to facilitate the splitting off of water and also carbon dioxide from organic substances containing hydroxyl and carboxylic acid groups and will be therefore, defined as decarboxylation catalysts. Such catalysts are for example difficultly reducible metal oxides, such as calcium, barium or strontium oxides, manganese oxides, chromium oxides, titanium oxide, zinc oxide, aluminium oxide and thorium oxide or mixtures or compounds thereof, and like compounds which are difficultly reducible by hydrogen, such as phosphates, as well as metals such as iron, copper, cobalt, nickel or their alloys and like base heavy metals. In many cases mixed catalysts containing the said metals or metal compounds may also be employed. In most cases manganous oxide or also catalysts containing the same have proved very efficient. It is often advantageous to deposit the catalysts on carriers such as pumice, especially alkali-bearing pumice, kieselguhr, asbestos, alumina and the like, and metals, such as those specifically referred to above and aluminium, may serve as carriers for the said difficultly reducible substances.

The process according to the present invention is preferably carried out by continuously passing vapours of the mixture of carboxylic acid substances over the catalyst chosen which is heated to from about 250° to about 400° C. and collecting the reaction product in cooled receivers.

By the process according to the present invention unsaturated aldehydes which are otherwise obtained only difficultly or in bad yields are obtained in very satisfactory yields so that these aldehydes are now rendered available for numerous purposes as for example for the production of alcohols of high molecular weight for example by a reduction of the aldehydes, oleic alcohol being thus obtained from oleic aldehyde. The unsaturated aldehydes may also find useful application as intermediates in the production of dyestuffs, pharmaceutical products, perfumes and other organic compounds.

The following examples will further illustrate how the present invention may be carried out in practice but the invention is not limited thereto. The parts are by weight.

*Example 1*

400 parts of granules of pumice having a diameter of about 5 millimeters are sprayed with 140 parts of finely divided manganese carbonate, then wetted with 180 parts of water and homogeneously stirred for a uniform distribution of the carbonate on the pumice. The product is then heated in vacuo to 250° C. in a vertically arranged tubular copper vessel, the manganese carbonate being then converted into manganous oxide by passing vapours of methanol over the mass for 4 hours. 60 parts of oleic acid and about 30 parts of formic acid are then slowly and uniformly introduced into the reaction vessel which is simultaneously kept at a pressure of from 40 to 60 millimetres of mercury. In a receiver connected to the reaction vessel a liquid product is collected from which, by fractional distillation, oleic aldehyde is separated in the form of a yellowish oily body. The residue consists of oleone.

*Example 2*

1 liter of granules of pumice having a diameter of about 4 millimetres are intimately mixed in vacuo with a warm solution of 1 kilogram of manganese nitrate in 200 cubic centimeters of water and freed from remainders of the solution by filtration, dried at 500° C. until the evolution of nitrogen oxides has ceased whereupon the whole is treated with hydrogen at 400° C. A mixture of vapours from 93 grams of formic acid and 147 grams of oleic acid together with 520 liters of carbon dioxide is passed per hour over each liter of the aforesaid catalyst at atmospheric pressure. By cooling the resulting gaseous mixture, water and practically pure oleic aldehyde are obtained. The yield of oleic aldehyde is about 90 per cent of the theoretical yield.

What we claim is:—

1. In the catalytic production of aldehydes from a mixture of a volatile unsaturated compound having an acyl group selected from the group consisting of the free acids, their anhydrides, chlorides and esters with alcohols containing up to 4 carbon atoms in the molecule, and a volatile formic acid compound selected from the group consisting of formic acid and its esters with alcohols containing up to 4 carbon atoms in the molecule by passing said mixture over a decarboxylation catalyst while heating, the step which comprises keeping the partial pressure of the vapour of said volatile unsaturated compound in the reaction space at the most at 1/30 of an atmosphere.

2. In the catalytic production of aldehydes from a mixture of a volatile aliphatic unsaturated carboxylic acid compound containing at least 10 carbon atoms in the unsaturated carboxylic acid radical and selected from the group consisting of the free acids, their anhydrides, chlorides and esters with alcohols containing up to 4 carbon atoms in the molecule by passing said mixture over a decarboxylation catalyst while heating, the step which comprises keeping the partial pressure of the vapour of said volatile aliphatic unsaturated carboxylic acid compound in the reaction space at the most at 1/30 of an atmosphere.

3. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule and a volatile formic acid compound selected from the group consisting of formic acid and its esters with alcohols containing up to 4 carbon atoms in the molecule by passing said mixture over a decarboxylation catalyst while heating, the step which comprises keeping the partial pressure of the vapour of said volatile unsaturated fatty acid compound in the reaction space at the most at 1/30 of an atmosphere.

4. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule and a volatile formic acid compound selected from the group consisting of formic acid and its esters with alcohols containing up to 4 carbon atoms in the molecule by passing said mixture over a decarboxylation catalyst while heating, the step which comprises employing the said formic acid compound in a quantity exceeding equimolecular proportion to said volatile unsaturated fatty acid compound and keeping the partial pressure of the vapour of said volatile unsaturated fatty acid compound in the reaction space at the most at 1/30 of an atmosphere.

5. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule and a volatile formic acid compound selected from the group consisting of formic acid and its esters with alcohols containing up to 4 carbon atoms in the molecule by passing said mixture over a decarboxylation catalyst while heating, the step which comprises employing the said formic acid compound in a quantity exceeding equimolecular proportion to said volatile unsaturated fatty acid compound and evacuating the reaction space thus keeping the partial pressure of the vapor of said volatile unsaturated fatty acid compound in the reaction space at the most at 1/30 of an atmosphere.

6. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule, and a volatile formic acid compound selected from the group consisting of formic acid and its esters with alcohols containing up to 4 carbon atoms in the molecule, by passing said mixture over a decarboxylation catalyst while heating, the step which comprises employing said formic acid compound in a quantity exceeding equimolecular proportion to said volatile unsaturated fatty acid compound and a quantity of an inert gaseous diluent sufficient to keep the partial pressure of the vapour of said volatile unsaturated fatty acid compound in the reaction space at the most at 1/30 of an atmosphere.

7. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 corbon atoms in the molecule, and a volatile formic acid compound selected from the group consisting of formic acid and its esters with alcohols containing up to 4 carbon atoms in the molecule, by passing said mixture over a decarboxylation catalyst while heating, the step which comprises employing said formic acid compound in a quantity sufficient to keep the partial pressure of the vapour of said volatile unsaturated fatty acid compound in the reaction space at the most at 1/30 of an atmosphere.

8. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule, and a volatile formic acid compound selected from the group consisting of formic acid and its esters with alcohols containing up to 4 carbon atoms in the molecule, by passing said mixture over a decarboxylation catalyst while heating, the step which comprises employing said formic acid compound in a quantity exceeding equimolecular proportion to said volatile unsaturated fatty acid compound and an inert gaseous diluent while evacuating the reaction space thus keeping the partial pressure of the vapour of said volatile unsaturated fatty acid compound in the reaction space at the most at 1/30 of an atmosphere.

9. In the catalytic production of aldehydes from a mixture of a volatile unsaturated fatty acid compound containing at least 10 carbon atoms in the unsaturated carboxylic acid radical and selected from the group consisting of the free acids, their anhydrides, chlorides and esters with alcohols containing up to 4 carbon atoms in the molecule, and a volatile formic acid compound selected from the group consisting of formic acid and its esters with alcohols containing up to 4 carbon atoms in the molecule, by passing the mixture over a decarboxylation catalyst while heating, the step which comprises employing said formic acid compound in a quantity of from about 3 to about 8 molecular proportions per each molecular proportion of said volatile unsaturated fatty acid compound and keeping the partial pressure of the vapor of said volatile unsaturated fatty acid compound in the reaction space at the most at 1/30 of an atmosphere.

10. In the catalytic production of aldehydes from a mixture of formic acid and a volatile unsaturated carboxylic acid compound resembling fatty acids of vegetable origin and containing at least 10 carbon atoms in the acid radical and selected from the group consisting of the free acids, their anhydrides, chlorides and esters with alcohols containing up to 4 carbon atoms in the molecule, by passing said mixture while heating over a decarboxylation catalyst essentially comprising manganous oxide, the step which comprises employing said formic acid in a quantity of from about 3 to about 8 molecular proportions per each molecular proportion of said volatile unsaturated fatty acid compound and keeping the partial pressure of the vapour of said volatile unsaturated fatty acid compound in the reaction space at the most at 1/30 of an atmosphere.

11. In the catalytic production of oleic aldehyde from a mixture of formic acid and a volatile oleic acid compound selected from the group consisting of the free acid, its anhydride, chloride and esters with alcohols containing up to 4 carbon atoms per molecule, while heating, over a decarboxylation catalyst essentially comprising manganous oxide, the step which comprises employing the formic acid in a quantity of from about 3 to about 8 molecular proportions per each molecular proportion of said oleic acid compound and keeping the partial pressure of the vapour of the said volatile oleic acid compound in the reaction space at from 1/30 to about 1/100 of an atmosphere.

OTTO SCHMIDT.
KARL HUTTNER.
GEORG KAEB.